United States Patent
Kobayashi et al.

(10) Patent No.: US 9,933,156 B2
(45) Date of Patent: Apr. 3, 2018

(54) PRESSURIZED FLUIDIZED FURNACE EQUIPMENT

(71) Applicant: Tsukishima Kikai Co., Ltd., Tokyo (JP)

(72) Inventors: Toshiki Kobayashi, Tokyo (JP); Takafumi Yamamoto, Tokyo (JP); Kazuyoshi Terakoshi, Tokyo (JP)

(73) Assignee: Tsukishima Kikai Co., Ltd., Tokyo (JP)

( * ) Notice: Subject to any disclaimer, the term of this patent is extended or adjusted under 35 U.S.C. 154(b) by 283 days.

(21) Appl. No.: 14/777,797

(22) PCT Filed: Feb. 14, 2014

(86) PCT No.: PCT/JP2014/053427
§ 371 (c)(1),
(2) Date: Sep. 17, 2015

(87) PCT Pub. No.: WO2014/156356
PCT Pub. Date: Oct. 2, 2014

(65) Prior Publication Data
US 2016/0273762 A1    Sep. 22, 2016

(30) Foreign Application Priority Data

Mar. 26, 2013  (JP) .................................. 2013-064470

(51) Int. Cl.
*F23C 10/16* (2006.01)
*F23J 15/00* (2006.01)
(Continued)

(52) U.S. Cl.
CPC ................ *F23C 10/16* (2013.01); *F23G 5/30* (2013.01); *F23J 15/006* (2013.01); *F23J 15/06* (2013.01);
(Continued)

(58) Field of Classification Search
CPC ............ F23C 10/16; F23G 5/30; F23J 15/006
See application file for complete search history.

(56) References Cited

U.S. PATENT DOCUMENTS 4,048,286 A * 9/1977 Rossmaier ........... B01D 53/501
162/30.1
4,630,436 A * 12/1986 Frutschi .................. F02C 3/205
60/39.183

(Continued)

FOREIGN PATENT DOCUMENTS

CN  1363764 A  8/2002
CN  101415908 A  4/2009
(Continued)

OTHER PUBLICATIONS

JP2007170703A—machine translation.*
(Continued)

*Primary Examiner* — Nathaniel Herzfeld
(74) *Attorney, Agent, or Firm* — Wood Herron & Evans LLP

(57) ABSTRACT

Pressurized fluidized furnace equipment includes a fluidized bed furnace (1) that pressurizes combustion air (B) and combusts a material to be treated (A) while fluidizing the same; an air preheater (3) that exchanges heat between a combustion exhaust gas (C) discharged from the fluidized bed furnace (1) and the combustion air (B); a dust collector (4) that removes dust from the combustion exhaust gas (C); and first and second superchargers (5, 6) to which the combustion exhaust gas (C), having undergone the heat exchange in the air preheater (3) and the dust removal in the dust collector (4), is supplied to generate compressed air (D, E). The first compressed air (D) generated in the first supercharger (5) is supplied as the combustion air (B) to the fluidized bed furnace (1) by way of the air preheater (3), and the second compressed air (E) generated in the second (Continued)

supercharger (6) is made to have a higher pressure than that of the first compressed air (D). Accordingly, it is possible to prevent the equipment from having more superchargers than is necessary for normal use although a plurality of first and second superchargers are provided, and to efficiently use the surplus combustion exhaust gas.

6 Claims, 1 Drawing Sheet

(51) Int. Cl.
  *F23J 15/06* (2006.01)
  *F23L 15/04* (2006.01)
  *F23G 5/30* (2006.01)
(52) U.S. Cl.
  CPC .......... *F23L 15/04* (2013.01); *F23G 2202/30* (2013.01); *F23G 2209/12* (2013.01); *F23J 2217/101* (2013.01); *F23J 2217/103* (2013.01); *F23J 2217/104* (2013.01); *F23J 2219/40* (2013.01); *F23J 2900/15004* (2013.01); *F23L 2900/05021* (2013.01); *Y02E 20/348* (2013.01)

(56) References Cited

U.S. PATENT DOCUMENTS

| | | | | |
|---|---|---|---|---|
| 5,255,507 | A | * | 10/1993 | Gounder ............... F01K 23/061 60/39.12 |
| 5,680,752 | A | * | 10/1997 | Skog ....................... F02C 3/107 60/726 |
| 6,123,910 | A | * | 9/2000 | Yoshii ................. B01D 53/346 423/235 |
| 6,244,037 | B1 | * | 6/2001 | Nakhamkin ............... F02C 6/06 60/773 |
| 6,561,036 | B1 | * | 5/2003 | Gustafsson ........... G01L 9/0026 73/114.18 |
| 2006/0088923 | A1 | * | 4/2006 | Jacob .................... A61K 9/1688 435/183 |
| 2011/0094236 | A1 | * | 4/2011 | Finkenrath ................ F02C 6/16 60/772 |

FOREIGN PATENT DOCUMENTS

| | | | | |
|---|---|---|---|---|
| JP | 56-113906 | A | | 9/1981 |
| JP | 03-279602 | A | | 12/1991 |
| JP | 5-231613 | A | | 9/1993 |
| JP | 10-073207 | A | | 3/1998 |
| JP | 2005-028251 | A | | 2/2005 |
| JP | 2005028251 | A | * | 2/2005 ............. F23G 5/006 |
| JP | 3783024 | B | | 6/2006 |
| JP | 2007-170705 | A | | 7/2007 |
| JP | 2007170703 | A | * | 7/2007 |
| JP | 2008025966 | A | | 2/2008 |
| JP | 2009-121778 | A | | 6/2009 |
| JP | 4831309 | B2 | | 12/2011 |
| WO | 2011/016556 | A1 | | 2/2011 |

OTHER PUBLICATIONS

European Patent Office, International Search Report issued in European Patent Application No. 14772740.8 dated Nov. 10, 2016, 6 pages.
Japanese Patent Office, International Search Report issued in corresponding International Patent Application No. PCT/JP2014/053427 and English-language translation, dated Mar. 18, 2014.
Chinese Patent Office, Office Action issued in Chinese Patent Application No. 201480016469.2 dated Sep. 2, 2016, 10 pages.

* cited by examiner

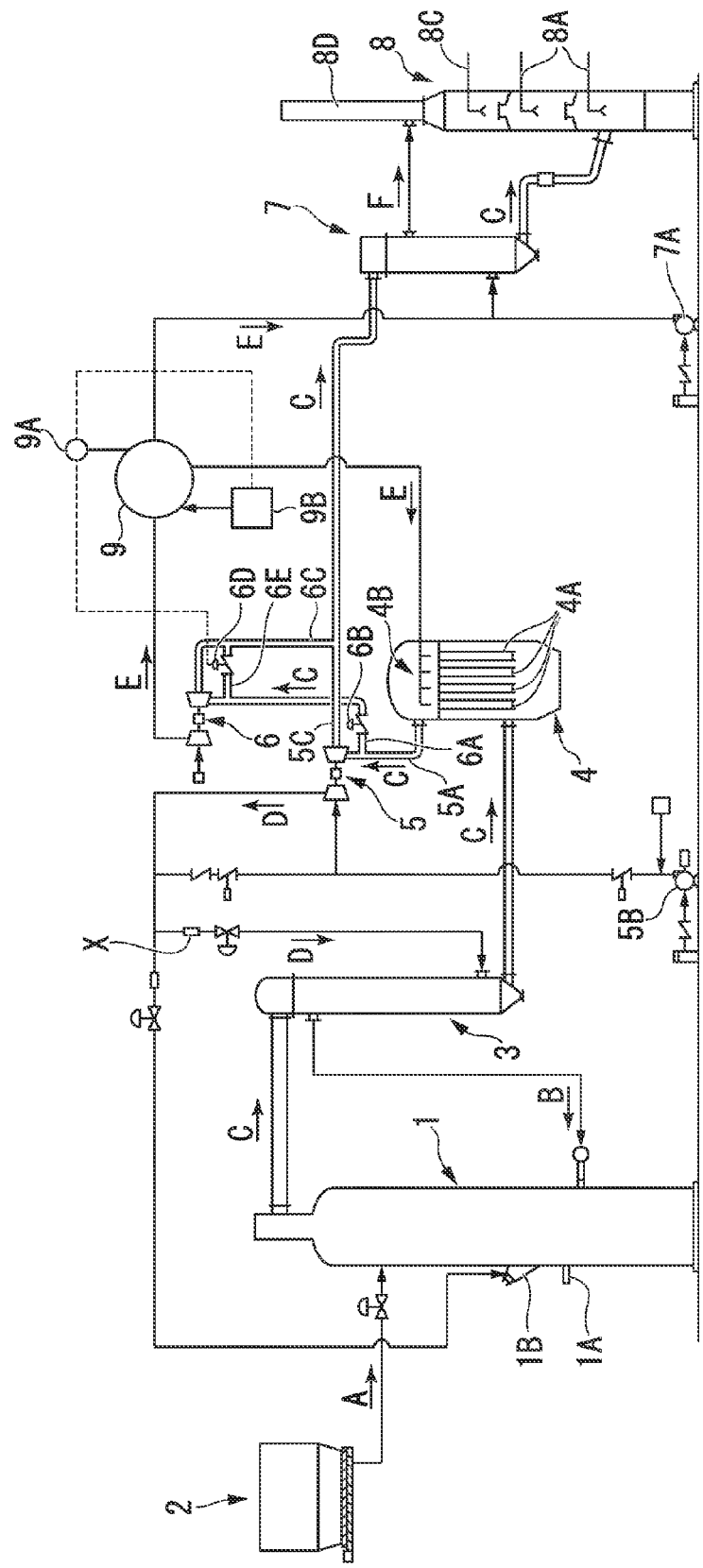

PRESSURIZED FLUIDIZED FURNACE EQUIPMENT

TECHNICAL FIELD

The present invention relates to pressurized fluidized furnace equipment including a pressurized fluidized furnace that pressurizes combustion air, particularly, by using a supercharger and combusts a material to be treated while fluidizing the same.

Priority is claimed on Japanese Patent Application No. 2013-064470, filed Mar. 26, 2013, the content of which is incorporated herein by reference.

BACKGROUND ART

As pressurized fluidized furnace equipment including such a supercharger, for example, Patent Document 1 describes pressurized fluidized furnace equipment including a plurality of first and second superchargers (turbochargers) that generate and blow compressed air to be supplied to a fluidized bed furnace, using combustion exhaust gas generated by a fluidized bed furnace (combustion furnace) that combusts a material to be treated (sludge). According to the pressurized fluidized furnace equipment described in Patent Document 1, these two superchargers are arranged in parallel. Thus, even in a case where the operation of one supercharger is stopped, the other supercharger is used. Accordingly, continuous treatment is possible without stopping the operation of the equipment.

CITATION LIST

Patent Document

[Patent Document 1] Japanese Patent Publication No. 3783024

SUMMARY OF INVENTION

Technical Problem

In order to allow continuous treatment of the material to be treated without stopping the operation of the equipment by using the other supercharger when the operation of one supercharger is stopped in this way, both of the two superchargers are required to be capable of independently generating compressed air required for combustion of the material to be treated in the fluidized bed furnace. Generally, in such a case, two superchargers with the same specifications having such capability are prepared. However, since one supercharger is sufficient during normal operation of the equipment, the equipment has more superchargers than is necessary for normal use.

Meanwhile, a lot of the combustion exhaust gas discharged from the fluidized bed furnace is supplied to one supercharger that generates the compressed air to be supplied to the fluidized bed furnace during the normal operation. However, all of the combustion exhaust gas is not supplied to this supercharger, and the remaining portion becomes a surplus. Here, even if the surplus combustion exhaust gas is supplied to the other supercharger, the compressed air to be generated is limited in pressure and flow rate in the superchargers with the same specifications as described above. Therefore, the application of the equipment is also limited.

The invention has been made under such conditions, and an object thereof is to provide pressurized fluidized furnace equipment that can prevent the equipment from having more superchargers than is necessary for normal use although a plurality of first and second superchargers are provided, and can effectively use surplus combustion exhaust gas.

Solution to Problem

In order to achieve the object by solving the problem, according to an aspect of the invention, there is provided a pressurized fluidized furnace equipment including a fluidized bed furnace that pressurizes combustion air and combusts a material to be treated while fluidizing the same; an air preheater that exchanges heat between a combustion exhaust gas discharged from the fluidized bed furnace and the combustion air; a dust collector that removes dust from the combustion exhaust gas; and first and second superchargers to which the combustion exhaust gas, having undergone the heat exchange in the air preheater and the dust removal in the dust collector, is supplied to generate compressed air, wherein the first compressed air generated in the first supercharger is supplied as the combustion air to the fluidized bed furnace by way of the air preheater, and wherein the second compressed air generated in the second supercharger is made to have a higher pressure than that of the first compressed air.

In the pressurized fluidized furnace equipment configured in this way, a lot of the combustion exhaust gas, having undergone the heat exchange in the air preheater and the dust removal in the dust collector, is supplied to the first supercharger as described above, and the first compressed air generated in the first supercharger is supplied as the combustion air to the fluidized bed furnace. The remaining portion of the combustion exhaust gas is supplied as a surplus to the second supercharger.

For this reason, since the combustion air is supplied only by the first supercharger during normal operation, the pressurized fluidized furnace equipment is efficient. The second compressed air generated in the second supercharger is made to have a higher pressure than that of the first compressed air. That is, the first and second superchargers have different specifications from each other. Accordingly, it is possible to effectively use the second compressed air generated by the excessive combustion exhaust gas effective in applications other than the combustion air.

Here, it is preferable that the pressurized fluidized furnace equipment further including first and second supply passages that supply a combustion exhaust gas to the first and second superchargers, respectively, in which flow rate adjusting means for adjusting the flow rate of the combustion exhaust gas to be supplied to the second supercharger on the basis of the pressure of the first compressed air may be provided in the second supply passage of the first and second supply passages.

In a case where the pressure of the first compressed air used as the combustion air of the fluidized bed furnace has dropped, the pressure of the first compressed air can be returned to a pressure required for combustion by reducing the flow rate of the combustion exhaust gas to be supplied to the second supercharger through the flow rate adjusting means. On the contrary, in a case where the pressure of the first compressed air has increased, more second compressed air can be generated by increasing the flow rate of the combustion exhaust gas to be supplied to the second supercharger. That is, the second compressed air generated by the surplus combustion exhaust gas can be effectively used without impairing the combustion of the material to be treated in the fluidized bed furnace.

As use of the second compressed air generated in this manner, firstly, the pressurized fluidized furnace equipment in which at least a portion of the second compressed air may be supplied to the dust collector, and may be used as pulse air configured to shake off the dust removed from the combustion exhaust gas. Such pulse air blows the compressed air intermittently against the filter of the dust collector from a side to which the purified combustion exhaust gas within the dust collector is discharged, and shakes off the dust adhering to the filter. Particularly, since the second compressed air has a higher pressure than that of the combustion exhaust gas to be supplied to the dust collector, the dust adhering to the filter can be reliably shaken off due to the pressure of the combustion exhaust gas from which dust is removed through the filter.

In addition, as use of the second compressed air, secondly, the pressurized fluidized furnace equipment in which at least a portion of the second compressed air may be supplied to an instrumentation device provided in the pressurized fluidized furnace equipment. Here, the instrumentation device provided in the pressurized fluidized equipment includes, for example, a pressure gauge that is installed in the fluidized bed furnace to measure a state within the furnace, an NOx meter and an oxygen meter that are provided in flow paths for the combustion exhaust gas to measure the properties of the combustion exhaust gas, and respective control valves for controlling the air flowing through the respective flow paths, or the like. In order to remove the adhering dust in the above pressure gauge or the NOx meter and the oxygen meters, it is necessary to intermittently blow the compressed air thereto. Additionally, the compressed air is also required for the driving of the control valve. Therefore, the high-pressure second compressed air can be effectively used.

In addition, thirdly, the pressurized fluidized furnace equipment in which at least a portion of the second compressed air may be supplied to an air preheater configured to prevent the formation of white smoke and may be used as white smoke prevention air. The air preheater configured to prevent white smoke preheats air with the combustion exhaust gas discharged from the first and second superchargers to generate the white smoke prevention air. The white smoke prevention air preheated in this way is mixed with the combustion exhaust gas when the combustion exhaust gas is discharged from the flue gas treatment tower, and removes steam contained in the combustion exhaust gas in the flue gas treatment tower. In normal air preheater configured to prevent the formation of white smoke, a blower or the like that supplies white smoke prevention air to be preheated is required. However, by using the second compressed air for the white smoke prevention air, the power of such a blower, or the like, can be reduced, or the blower or the like can be rendered unnecessary depending on the situation.

However, the second compressed air may be supplied only to any one type of the above-described dust collector, the instrumentation device, and air preheater configured to prevent the formation of white smoke, may be supplied to two types, or may be supplied to all of the three types. However, the supply of the second compressed air to the dust collector and the instrumentation device is intermittent as described above. Therefore, it is possible to connect the compressed air storage tank to the second supercharger to allow the second compressed air to be stored in the compressed air storage tank and to intermittently supply the second high-pressure compressed air to the dust collector and the instrumentation device if necessary. Particularly, when at least a portion of the second compressed air is used as white smoke prevention air as described above, the second compressed air is supplied to the air preheater configured to prevent the formation of white smoke via the compressed air storage tank connected to the second supercharger in this way. Additionally, by connecting the compressor, which supplies compressed air to the compressed air storage tank when the pressure within the compressed air storage tank becomes lower than the lower limit set value, to the compressed air storage tank, the white smoke prevention air can be stably generated irrespective of the fluctuation of the amount of supply of the second compressed air.

Advantage Effects of the Invention

As described above, according to pressurized fluidized furnace equipment of the invention, it is possible to effectively use the second compressed air that is generated from the surplus combustion exhaust gas and has a higher pressure than the first compressed air supplied as the combustion air to the fluidized bed furnace while avoiding a situation in which the equipment has more superchargers than is necessary for normal use.

BRIEF DESCRIPTION OF DRAWINGS

FIG. 1 is a schematic view of the pressurized fluidized furnace equipment showing an embodiment of the invention.

DESCRIPTION OF EMBODIMENTS

FIG. 1 shows an embodiment of the pressurized fluidized furnace equipment of the invention. In addition, the disclosed technique is not limited to the following embodiment, and various alternations can be carried out without departing from the scope of the invention. A pressurization type fluidized bed furnace that combusts a material to be treated A while fluidizing the same is shown reference numeral 1 in FIG. 1, and the inside of the fluidized bed furnace 1 is filled with a fluidizing medium. The material to be treated A, such as sewage sludge and municipal waste, which is supplied into the fluidized bed furnace 1 from a storage device 2, is heated and combusted while fluidized with the fluidizing medium by high-temperature and high-pressure combustion air B supplied from a furnace floor. The fluidized bed furnace 1 includes an auxiliary combustion apparatus 1A and a starting burner 1B, instrumentation devices (not shown), such as a pressure gauge and a thermometer, which measure states, such as pressure and temperature within the furnace.

A high-temperature combustion exhaust gas C, which is generated by the material to be treated A being combusted in the fluidized bed furnace 1, is supplied to, for example, a shell tube type air preheater 3, and exchanges heat with the combustion air B supplied to the fluidized bed furnace 1, thereby heating the combustion air B to raise the temperature thereof to a high temperature of about 200° C. to 700° C. as described above.

The dust or the like supplied to a dust collector 4 and contained in the combustion exhaust gas C is removed from the combustion exhaust gas C that has heated the combustion air B in the air preheater 3 in this way. The dust collector 4 includes, for example, a ceramic filter 4A. That is, when the combustion exhaust gas C passes through a filter that has minute pores and is made of ceramics, the combustion exhaust gas C is purified by the dust or the like in the combustion exhaust gas C being trapped and removed. In addition, a pulse air jetting device 4B, which intermittently blows compressed air toward the ceramic filter 4A that has trapped the dust or the like in this way and which dislodges the dust adhering to the filter, is provided on a side where the purified combustion exhaust gas C within the dust collector 4 is discharged.

The combustion exhaust gas C purified in the dust collector 4 is discharged at a pressure of about 100 kPa to 200 kPa and a temperature of about 250° C. to 650° C., is supplied to a first supercharger 5 through a first supply passage 5A, passes through a second supply passage 6A branching from the first supply passage 5A, and is supplied to a second supercharger 6 via flow rate adjusting means 6B, such as a valve or a damper. That is, the first and second superchargers 5 and 6 are disposed in parallel. In addition, the first and second superchargers 5 and 6 are so-called well-known turbochargers including a turbine that is rotated at high speed by the combustion exhaust gas C being supplied thereto, and a compressor that is coaxially coupled to the turbine and rotated at high speed integrally with the turbine to thereby generate high-pressure compressed air. However, the first and second superchargers 5 and 6 have different specifications from each other. For example, it is preferable to adopt a supercharger having specifications in which the ratio (pressure ratio) of the pressure of air supplied to the compressor and the pressure of the compressed air generated in and discharged from the compressor is higher in the second supercharger 6 than in the first supercharger 5 in a case where conditions, such as the flow rate, pressure, and temperature of the combustion exhaust gas C supplied to the turbine are the same.

50% to 90% of the total flow ($Nm^3$/h) of the combustion exhaust gas C discharged from the dust collector 4 is supplied to the first supercharger 5, and air taken in from the atmospheric air is pressurized in the above compressor, whereby first compressed air D of a pressure of about 100 kPa to 200 kPa is generated. The first compressed air D exchanges heat with the combustion exhaust gas C via the air preheater 3, is thereby raised in temperature to about 200° C. to 700° C. as described above, and is supplied as the combustion air B to the fluidized bed furnace 1. In addition, a starting blower 5B is connected to the compressor of the first supercharger 5, and the starting blower 5B is also connected to the starting burner 1B of the fluidized bed furnace 1.

Additionally, the combustion exhaust gas C of more than 10% and less than 50%, which is the remainder excluding a part supplied to the first supercharger 5, of the total flow of the combustion exhaust gas C discharged from the dust collector 4 is supplied to the second supercharger 6. The second supercharger 6 having specifications in which the second supercharger pressurizes air, which is also taken in from the atmospheric air, with the combustion exhaust gas C that is less than the amount of the combustion exhaust gas supplied to the first supercharger 5 in this way, and generates second compressed air E having higher pressure but a slightly smaller flow rate than the first compressed air D. The pressure of this second compressed air E is, for example, 400 kPa to 700 kPa.

The amount of supply of the combustion exhaust gas C to the first supercharger 5 is controlled by adjusting the flow rate of the combustion exhaust gas C to be supplied to the second supercharger 6 by the flow rate adjusting means 6B provided in the second supply passage 6A, on the basis of the flow rate of the first compressed air D measured by flow rate measuring means X. In addition, the flow rate adjustment of the combustion exhaust gas C by the flow rate adjusting means 6B may be performed on the basis of the pressure of the first compressed air D to be measured by a pressure gauge (not shown). Moreover, the flow rate adjustment may be performed on the basis of the pressure of the first compressed air D supplied as the combustion air B to the fluidized bed furnace 1 by way of the air preheater 3, depending on the measurement results of the pressure gauge that measures the pressure within the fluidized bed furnace 1. In addition, in order to control the flow rate adjusting means 6B, specific values or set values consisting of a specific range regarding the flow rate and the pressure of the first compressed air D are stored in advance in control means (not shown). These set values may be appropriately calculated on the basis of parameters showing the operational state of equipment, such as the supply amount, the combustion temperature, or the like of the material to be treated A.

That is, in a case where the flow rate of the first compressed air D is lower than a set value stored in the control means, the flow rate of the combustion exhaust gas C to be supplied to the second supercharger 6 is reduced by reducing the opening degree of a valve or the like of the flow rate adjusting means 6B. Similarly, the pressure of the first compressed air D is increased by simultaneously increasing the flow rate of the combustion exhaust gas C to be supplied to the first supercharger 5. On the contrary, in a case where the pressure of the first compressed air D is higher than a set value stored in the control means, the flow rate of the combustion exhaust gas C to be supplied to the second supercharger 6 is increased by opening the flow rate adjusting means 6B. Simultaneously, the combustion exhaust gas C to be supplied to the first supercharger 5 is reduced and the pressure of the first compressed air D is reduced.

The combustion exhaust gases C, which have generated the first compressed air D and the second compressed air E in the first and second superchargers 5 and 6 in this way, are mixed with each other after being discharged by way of the first and second discharge passages 5C and 6C, respectively, and the mixed gas is supplied to an air preheater 7 configured to prevent the formation of white smoke. In addition, the second supply passage 6A and the second discharge passage 6C of the second supercharger 6 are connected together by a bypass passage 6E including second flow rate adjusting means 6D, such as a valve and a damper. The flow rate of the combustion exhaust gas C to be supplied to the second supercharger 6 is also made to be adjustable by the second flow rate adjusting means 6D.

In the air preheater 7 configured to prevent the formation of white smoke, the high-temperature combustion exhaust gas C and the air, which have not yet passed through the first and second superchargers 5 and 6, exchange heat with each other, using a shell tube type or a plate type heat exchanger, and air is preheated and formed as white smoke prevention air F, while the temperature of the combustion exhaust gas C drops. In addition, the air preheater 7 configured to prevent the formation of white smoke includes a blower 7A capable of supplying preheated air. The combustion exhaust gas C of which the temperature has dropped is supplied to a flue gas treatment tower 8.

The combustion exhaust gas C of which the temperature has dropped is supplied from a lower portion of the flue gas treatment tower 8 and rises, and caustic soda water and water are sprayed from spray tubes 8A and 8C during the rising, whereby impurities or the like are removed and cooled. The combustion exhaust gas C is heated by being mixed with the white smoke prevention air F, which is preheated to prevent white smoke from being generated when being discharged from a chimney 8D, within the chimney 8D.

Meanwhile, in the present embodiment, a compressed air storage tank 9 is connected to the compressor of the second supercharger 6, and the second compressed air E generated in the second supercharger 6 is first stored in the compressed air storage tank 9. The compressed air storage tank 9 includes a compressor 9B that is separate from the pressure gauge 9A and the second supercharger 6. Then, the high-pressure second compressed air E stored in the compressed air storage tank 9 is supplied to respective devices of the pressurized fluidized furnace equipment for applications other than the combustion air B.

In the present embodiment, at least a portion of the second compressed air E, as shown in FIG. 1, is firstly supplied as the pulse air to the pulse air jetting device 4B of the dust collector 4. Secondly, at least a portion of the second compressed air E is supplied to the instrumentation devices provided in the pressurized fluidized furnace equipment. Here, the instrumentation devices provided in the pressurized fluidized furnace equipment include at least one of, for example, the pressure gauge and thermometer that are installed in the fluidized bed furnace 1, NOx meters and oxygen meters that are provided in respective flow paths of the combustion exhaust gas C and measure the properties of the combustion exhaust gas C, and control valves when valves and dampers, which are provided in the respective flow paths, such as the flow rate adjusting means 6B and 6D, are used as air driving control valves. Thirdly, at least a portion of the second compressed air E is also used as the white smoke prevention air F instead of the air supplied the blower 7A in the air preheater 7 configured to prevent the formation of white smoke.

In the pressurized fluidized furnace equipment having such a configuration, a lot of the combustion exhaust gas C discharged from the fluidized bed furnace 1 is supplied to the first supercharger 5 to generate the first compressed air D. The first compressed air D is preheated in the air preheater 3 and is supplied as the combustion air B to the fluidized bed furnace 1. Therefore, since the combustion air B can be supplied only by the first supercharger 5 during normal operation, the pressurized fluidized furnace equipment is efficient. In addition, during the starting of the equipment, combustion air is supplied from the starting blower 5B to the starting burner 1B of the fluidized bed furnace 1. For example, during this starting or when it is impossible to supply a sufficient amount of the first compressed air D from the first supercharger 5 to the fluidized bed furnace 1, compressed air is also supplied to the first supercharger 5 and supplied to the fluidized bed furnace 1 from the starting blower 5B.

Meanwhile, the remaining surplus combustion exhaust gas C supplied to the first supercharger 5 is supplied to the second supercharger 6 to generate the second compressed air E. This second compressed air E has a smaller flow rate but a higher pressure than the first compressed air D. In the pressurized fluidized furnace equipment having the above configuration, such high-pressure second compressed air E can be effectively used in applications other than the combustion air B of the material to be treated A in the fluidized bed furnace 1 of the pressurized fluidized furnace equipment.

That is, as in the present embodiment, firstly, in a case where the second compressed air E is supplied as pulse air to the pulse air jetting device 4B of the dust collector 4, the second compressed air E has a higher pressure than the combustion exhaust gas C supplied to the dust collector 4. Therefore, the dust adhering to the ceramic filter 4A can be reliably dislodged by the pressure of the combustion exhaust gas C from which dust has been removed through the ceramic filter 4A. Moreover, since the second compressed air E is raised in temperature by being compressed, a rapid temperature drop of the ceramic filter 4A is not caused even if the second compressed air E is blown against the ceramic filter 4A exposed to the high temperature of the combustion exhaust gas C. Therefore, any damage can be prevented from occurring in the ceramic filter 4A due to a temperature difference.

Secondly, even in a case where the second compressed air E is supplied to the instrumentation devices, such as the pressure gauge of the fluidized bed furnace 1 of the pressurized fluidized furnace equipment or the NOx meters and the oxygen meters provided in the flow paths of the combustion exhaust gas C, the dust adhering to such instrumentation devices can be removed by the second high-pressure compressed air E. Moreover, in a case where the instrumentation devices, such as the valves and the dampers, which are provided in the respective flow paths, are used as the air driving control valves, the second compressed air E generated by the surplus combustion exhaust gas C can be effectively used even if the second compressed air E is used as driving air. Moreover, since the supply of the second compressed air E to such instrumentation devices and the pulse air jetting device 4B is intermittent, a low flow rate of the second compressed air E can also be effectively used.

Furthermore, particularly in a case where the second compressed air E is stored in the compressed air storage tank 9 as in the present embodiment, the second compressed air E can be stably supplied from the compressed air storage tank 9, irrespective of the amount of supply of the combustion exhaust gas C supplied to the first supercharger 5. Therefore, thirdly the second compressed air E can also be effectively used as the white smoke prevention air F by being supplied to the air preheater configured to prevent the formation of white smoke. Therefore, by supplying the second compressed air E to the air preheater 7 configured to prevent the formation of white smoke in this way, the power of the blower 7A provided in the air preheater 7 configured to prevent the formation of white smoke can be reduced, and the blower 7A itself can be rendered unnecessary depending on the situation. Additionally, by storing the second compressed air E in the compressed air storage tank 9 in this way, it is possible to stably supply the second compressed air E if necessary even when the second compressed air E is intermittently supplied to the pulse air jetting device 4B and the instrumentation devices.

Air should be continuously supplied to the air preheater 7 configured to prevent the formation of white smoke. Meanwhile, the second compressed air E is generated by the remaining surplus combustion exhaust gas C that has generated the first compressed air D in the first supercharger 5. Therefore, as the amount of the first compressed air D to be supplied as the combustion air 13 from the first supercharger 5 to the fluidized bed furnace 1 fluctuates along with properties, such as the moisture and held heat quantity of the material to be treated A, and the fluctuation of the amount of supply of the material to be treated to the fluidized bed furnace 1, the amount of supply of the second compressed air E also changes. For this reason, particularly in a case where the second compressed air E is supplied to the air preheater 7 configured to prevent the formation of white smoke in this way, the pressure within the compressed air storage tank 9 is measured by the pressure gauge 9A. When the pressure of the second compressed air E within the compressed air storage tank 9 becomes lower than a predetermined lower limit, it is desirable to control the supply of compressed air to the compressed air storage tank 9 by means of the compressor 9B.

Additionally, in a case where the second compressed air E is exclusively used to be supplied y to the pulse air jetting device 4B and the instrumentation devices, control may be performed so as to supply the second compressed air E to the air preheater 7 configured to prevent the formation of white smoke, for example, when the pressure within the compressed air storage tank 9 measured by the pressure gauge 9A becomes a predetermined upper limited set value. Additionally, while the second compressed air E is not supplied from the compressed air storage tank 9, the white smoke prevention air F may be generated by supplying air to the air preheater 7 configured to prevent the formation of white smoke from the blower 7A to preheat the air.

Moreover, in the present embodiment, the flow rate adjusting means 6B is provided in the second supply passage 6A branching from the first supply passage 5A that supplies the combustion exhaust gas C to the first supercharger 5. The flow rate adjusting means 6B, as described above is controlled on the basis of the pressure of the first compressed air D supplied as the combustion air B from the first supercharger 5 to the fluidized bed furnace 1. For this reason, the flow rate of the combustion exhaust gas C decreases depending on the properties and the supply amount of the material to be treated A. With this decrease, when the amount of supply of the first compressed air D decreases and the pressure also has dropped, the flow rate of the combustion exhaust gas C to be supplied from the second supply passage 6A to the second supercharger 6 is reduced by the flow rate adjusting means 6B to increase the combustion exhaust gas C to be supplied to the first supercharger 5, so that a sufficient amount of the combustion air B configured to combust the material to be treated A can be supplied to the fluidized bed furnace 1 and stable treatment can be achieved.

On the contrary, when the flow rate of the combustion exhaust gas C increases and the supply amount and the pressure of the first compressed air D increase, the flow rate of the combustion exhaust gas C to be supplied to the second supercharger 6 is increased by the flow rate adjusting means 6B, so that the supply amount and the pressure of the first compressed air D to be supplied as the combustion air B to the fluidized bed furnace 1 can be reduced, and abnormal combustion, such as the combustion temperature becoming excessively high in the fluidized bed furnace 1, can be prevented from occurring. Moreover, it is possible to generate more second compressed air E.

Moreover, in the present embodiment, the second supply passage 6A and the second discharge passage 6C of the second supercharger 6 are connected together by the bypass passage 6E including the second flow rate adjusting means 6D. Therefore, for example, in a case where the amount of supply of the combustion exhaust gas C is still excessive even if a sufficient amount of the combustion exhaust gas C is supplied to the first and second superchargers 5 and 6, the second flow rate adjusting means 6D is opened to bypass the second discharge passage 6C from the second supply passage 6A to the combustion exhaust gas C, so that it is possible to avoid a situation in which a burden greater than that needed is caused in the first and second superchargers 5 and 6.

However, the second flow rate adjusting means 6D is exclusively used for a case when the amount of supply of the combustion exhaust gas C is excessive in this way. Therefore, particularly in a case where the compressed air storage tank 9 is connected to the second supercharger 6 as in the present embodiment, the second compressed air E generated by the second supercharger 6 can be stored in the compressed air storage tank 9 and can be effectively used if the second compressed air E is within a proof-pressure range of the compressed air storage tank 9 and within a range of the performance of the second supercharger 6. Thus, during the normal operation, the second flow rate adjusting means 6D may be closed, and the flow rate of the combustion exhaust gas C to be supplied to the second supercharger 6 by the flow rate adjusting means 6B provided in the second supply passage 6A may be adjusted. In this case, the control can be simplified compared to adjusting the flow rate using the two flow rate adjusting means 6B and 6D.

In the present embodiment, a case occurs where the second compressed air E is supplied to all of the three types of devices including the pulse air jetting device 4B of the dust collector 4, the instrumentation devices, and the air preheater 7 configured to prevent the formation of the white smoke. However, the second compressed air E may be supplied only to any one type of these devices, or may be supplied to two types of the three types. Moreover, other than these devices, the second compressed air E may be supplied to other devices provided in the above pressurized fluidized furnace equipment that requires high-pressure compressed air. For example, the second compressed air E may be used to seal air and purge air of the above devices.

INDUSTRIAL APPLICABILITY

According to the invention, it is possible to provide a pressurized fluidized furnace equipment that can prevent the equipment from having more superchargers than is necessary for normal use although a plurality of first and second superchargers are provided, and can effectively use surplus combustion exhaust gas.

REFERENCE SIGNS LIST

1: FLUIDIZED BED FURNACE
2: STORAGE DEVICE
3: AIR PREHEATER
4: DUST COLLECTOR
4B: PULSE AIR JETTING DEVICE
5: FIRST SUPERCHARGER
5A: FIRST SUPPLY PASSAGE
6: SECOND SUPERCHARGER
6A: SECOND SUPPLY PASSAGE
6B: FLOW RATE ADJUSTING MEANS
6D: SECOND FLOW RATE ADJUSTING MEANS
6E: BYPASS PASSAGE
7: AIR PREHEATER FOR WHITE SMOKE PREVENTION
8: FLUE GAS TREATMENT TOWER
9: COMPRESSED AIR STORAGE TANK
A: MATERIAL TO BE TREATED
B: COMBUSTION AIR
C: COMBUSTION EXHAUST GAS
D: FIRST COMPRESSED AIR
E: SECOND COMPRESSED AIR
F: WHITE SMOKE PREVENTION AIR

What is claimed is:
1. Pressurized fluidized furnace equipment comprising:
   a fluidized bed furnace that pressurizes combustion air and combusts a material to be treated while fluidizing the same;

an air preheater that exchanges heat between a combustion exhaust gas discharged from the fluidized bed furnace and the combustion air;

a dust collector that removes dust from the combustion exhaust gas; and first and second superchargers to which the combustion exhaust gas, having undergone the heat exchange in the air preheater and the dust removal in the dust collector, is supplied to generate compressed air, first and second supply passages that supply a combustion exhaust gas to the first and second superchargers, respectively, wherein the first compressed air generated in the first supercharger is supplied as the combustion air to the fluidized bed furnace by way of the air preheater, wherein the second compressed air generated in the second supercharger is made to have a higher pressure than that of the first compressed air, and wherein flow rate adjusting means configured to adjust the flow rate of the combustion exhaust gas to be supplied to the second supercharger on the basis of the pressure of the first compressed air is provided in the second supply passage of the first and second supply passages.

2. The pressurized fluidized furnace equipment according to claim 1, wherein at least a portion of the second compressed air is supplied to the dust collector, and is used as pulse air which is used to shake off the dust removed from the combustion exhaust gas.

3. The pressurized fluidized furnace equipment according to claim 1, wherein at least a portion of the second compressed air is supplied to an instrumentation device provided in the pressurized fluidized furnace equipment.

4. The pressurized fluidized furnace equipment according to claim 1, wherein at least a portion of the second compressed air is supplied to an air preheater configured to prevent the formation of a white smoke and is used as white smoke prevention air.

5. The pressurized fluidized furnace equipment according to claim 1, wherein a compressed air storage tank is connected to the second supercharger, and the second compressed air is capable of being stored in the compressed air storage tank.

6. The pressurized fluidized furnace equipment according to claim 1, wherein at least a portion of the second compressed air is supplied to an air preheater configured to prevent the formation of a white smoke provided in the pressurized fluidized furnace equipment via a compressed air storage tank connected to the second supercharger and is used as white smoke prevention air, and wherein a compressor, which supplies compressed air to the compressed air storage tank when the pressure within the compressed air storage tank becomes lower than a predetermined lower limit, is connected to the compressed air storage tank.

* * * * *